United States Patent [19]

Nagashima

[11] Patent Number: 5,363,428
[45] Date of Patent: Nov. 8, 1994

[54] DYNAMIC CHANNEL ASSIGNMENT CORDLESS TELECOMMUNICATION NETWORK

[75] Inventor: Noriaki Nagashima, Tokyo, Japan

[73] Assignee: NEC Corporation, Tokyo, Japan

[21] Appl. No.: 884,154

[22] Filed: May 18, 1992

[30] Foreign Application Priority Data

May 17, 1991 [JP] Japan .................................. 3-113457

[51] Int. Cl.$^5$ .................... H04M 11/00; H04Q 7/00; H04B 1/00
[52] U.S. Cl. ........................................ 379/58; 379/61; 455/33.1; 455/34.1; 455/56.1
[58] Field of Search ............... 379/56, 58, 59, 60, 379/61; 455/9, 17, 33.1, 34.1, 56.1

[56] References Cited

U.S. PATENT DOCUMENTS

| | | | |
|---|---|---|---|
| 4,475,010 | 10/1984 | Huensch et al. | 455/33.1 |
| 5,125,102 | 6/1992 | Childress et al. | 455/9 |
| 5,134,709 | 7/1992 | Bi et al. | 455/33.1 |
| 5,157,709 | 10/1992 | Ohteru | 379/58 |
| 5,197,093 | 3/1993 | Knuth et al. | 379/61 |
| 5,203,012 | 4/1993 | Patsiokas et al. | 455/34.1 |
| 5,212,803 | 5/1993 | Uddenfeldt et al. | 455/33.1 |
| 5,257,399 | 10/1993 | Kallin et al. | 455/33.1 |
| 5,257,400 | 10/1993 | Yoshida | 455/33.1 |
| 5,263,176 | 11/1993 | Kojima | 455/34.1 |
| 5,280,630 | 1/1994 | Wang | 455/56.1 |

Primary Examiner—Curtis Kuntz
Assistant Examiner—William D. Cumming
Attorney, Agent, or Firm—Sughrue, Mion, Zinn, Macpeak & Seas

[57] ABSTRACT

In a microcellular cordless telephone network, radio speech channels are divided into several channel groups such that no intermodulation products occur among the channels of each group. In each microcell is located a base unit to which one of the channel groups is dynamically assigned. To achieve the channel assignment, each base unit generates priority values of the channel groups as representations of usage of the channel groups, constantly updates them through a statistical process and assigns one of the channel groups having a maximum priority value to the base unit.

10 Claims, 7 Drawing Sheets

CHANNEL GROUP TABLE 20

| GROUP NUMBER | SPEECH CHANNEL NUMBER |
|---|---|
| GROUP #1 | #1, #2, #4, #8, #13, #21, #35 |
| GROUP #2 | #3, #5, #6, #10, #12, #20, #32 |
| GROUP #3 | #7, #9, #14, #15, #25, #29, #38 |
| ⋮ | ⋮ |

GROUP PRIORITY TABLE 21

| GROUP NUMBER | PRIORITY |
|---|---|
| GROUP #1 | 0.5 |
| GROUP #2 | 0.76 |
| GROUP #3 | 0.64 |
| ⋮ | ⋮ |

CHANNEL STATUS TABLE 22

| CHANNEL NUMBER | BUSY/IDLE |
|---|---|
| CHANNEL #1 | 1/0 |
| CHANNEL #2 | 1/0 |
| CHANNEL #3 | 1/0 |
| ⋮ | ⋮ |

FIELD INTENSITY TABLE 23

| CHANNEL NUMBER | INTENSITY |
|---|---|
| CHANNEL #1 | 0/1/2 * |
| CHANNEL #2 | 0/1/2 |
| CHANNEL #3 | 0/1/2 |
| ⋮ | ⋮ |

*LEGEND:
0 = IDLE
1 = CHANNEL BUSY OF ASSIGNED GROUP
2 = CHANNEL BUSY OF NONASSIGNED GROUP

GROUP ASSIGNMENT REGISTER 24

| ASSIGNED GROUP NO. |
|---|

DYNAMIC CHANNEL ASSIGNMENT CORDLESS TELECOMMUNICATION NETWORK

BACKGROUND OF THE INVENTION

The present invention relates generally to switched telephone networks for serving an area which is divided into relatively small service zones in which cordless telephones are located, and more specifically to a channel assignment technique for use with such cordless telephone networks.

With cellular mobile telephony, automobile stations are usually located at such greater distances apart that signals transmitted from mobile stations are not strong enough to interfere with other stations to produce intermodulation products, No difficulty arises in assigning speech channels to the mobile stations. However, with microcellular systems which are currently employed in business environments, the service area is divided into small zones, or microcells with a radius of as small as several tens of meters and cordless telephones are usually located at short distances apart. In some instances, the distance between adjacent cordless stations may be as short as 1 meter. In addition, the size and shape of each of the microcells differ from one cell to another and a great number of base units must be provided. One problem associated with such microcellular systems is that due to the high density of cordless units intermodulation products are often generated between adjacent units and seriously affect the operation of the system.

SUMMARY OF THE INVENTION

It is therefore an object of the present invention to provide a channel assignment technique for dynamically assigning channels to each of the divided microcells of a cordless telecommunication network. According to the present invention, there is provided a telecommunication network for serving cordless units located in a plurality of service zones, Radio speech channels, which are allotted to the network, are organized into a plurality of channel groups such that no intermodulation products occur among the channels of each group. The network comprises a plurality of base units located respectively in the service zones. Each base unit establishes two-way speech channels with those of the cordless units which are located in the same zone as the base unit and generates priority values of the channel groups as representations of usages of the groups through a statistical process. According to the priority values, one of the channel groups is assigned to the base unit.

Preferably, a priority table is provided having entries corresponding respectively to the channel groups for storing priority values of the channel groups respectively in the corresponding entries. The field intensity of each channel of all groups is measured and the stored priority value of the channel group (or currently assigned to the base unit) to which the radio channel belongs is increased if the measured field intensity is higher than a specified value and decreased if the measured intensity is lower than the specified value. A maximum value of the priority values stored in the priority table is detected and one of the channel groups having the maximum value is assigned to the base unit instead of the channel group currently assigned to the base unit.

Preferably, the detected maximum value is compared with the priority value of the currently assigned-channel group and the channel group having the maximum value is reassigned to the base unit if the maximum value is greater than the previous value by more than a predetermined amount.

According to a specific aspect of this invention, the network includes a channel status table having entries corresponding respectively to the channels of all the groups for storing busy/idle status bits respectively in the corresponding entries indicating the busy/idle states of the channels, and a priority table having entries corresponding respectively to the channel groups for storing priority values of the channel groups respectively in the corresponding entries. Each base unit receives a call request to or from the cordless units located in the same zone as the base unit, and updates the busy/idle status bits of the channels of the channel group which is currently assigned to the base unit according to the presence and absence of the call request. All busy/idle status bits are sequentially retrieved from the channel status table, and each channel is classified as representing a first possible state of the channel if the retrieved status bit indicates a busy state. The field intensity of each channel is measured if the retrieved status bit of the channel indicates an idle state, and this channel is classified as representing a second possible state if the measured intensity the channel is lower than a specified value or a third possible state (a busy state of a channel of a group not currently assigned to the base unit) if the measured intensity is higher than the specified value. The base unit determines whether all channels are classified as simultaneously representing a mixture of the first, second and third possible states. If this is the case, the stored priority value of the channel group which is currently assigned to the base unit is increased if each channel is classified as representing the third possible state, and that stored value is decreased if each channel is classified as representing the first or second possible state.

BRIEF DESCRIPTION OF THE DRAWINGS

The present invention will be described in further detail with reference to the accompanying drawings, in which.

DETAILED DESCRIPTION

Figure 1:
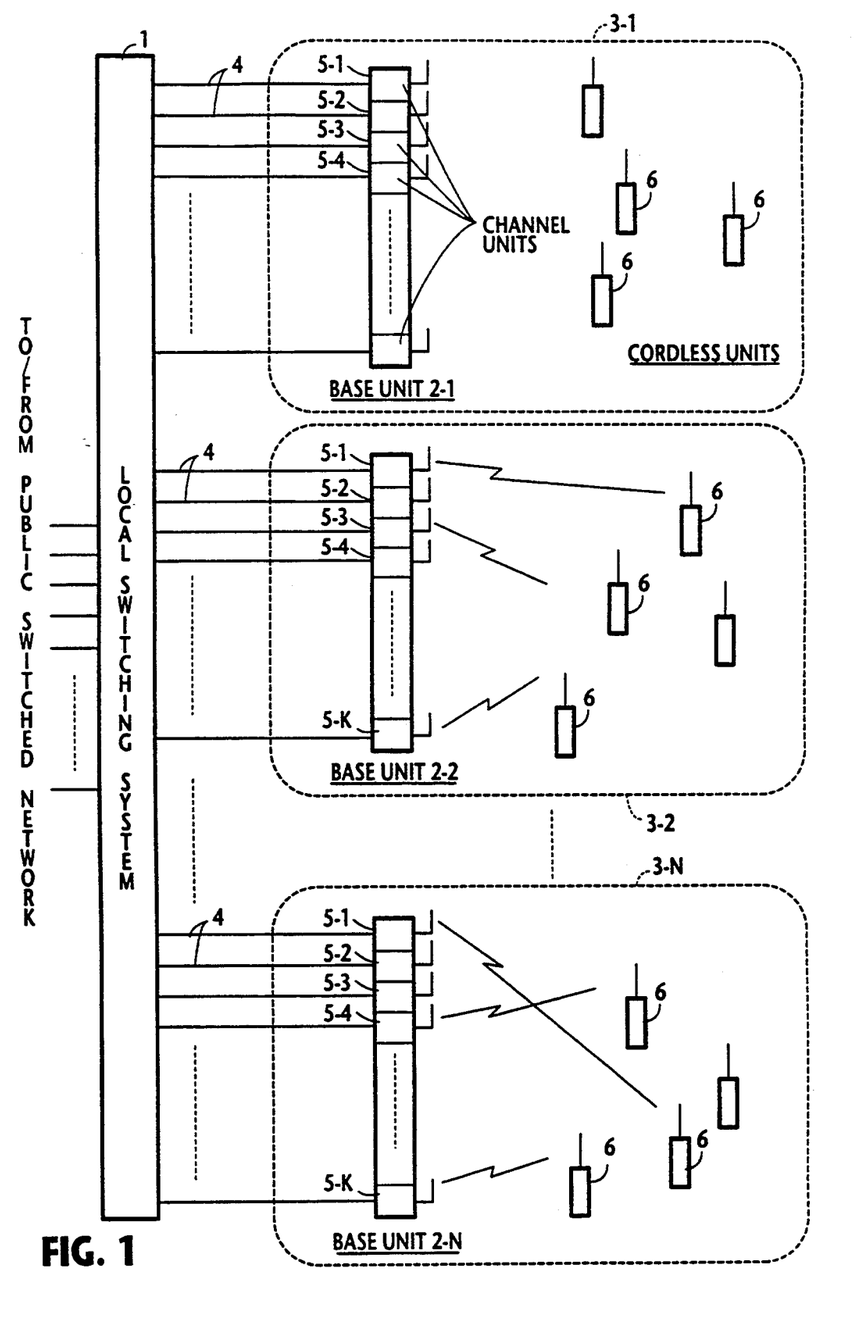
FIG. 1 is a block diagram of a switched cordless telephone network in which the dynamic channel assignment of the present invention is implemented.

FIG. 1 is a block diagram of a private switched cordless telephone network in which the dynamic channel assignment scheme of the present invention is shown incorporated. In FIG. 1, the system comprises a local switching system 1 such as PBX (private branch exchange) connected through exchange lines to a public switched network not shown. Connected by extension lines 4 to the local switching system 1 are base units 2-1-2-N of identical construction which are located in strategic points of respective microcells, or service zones 3-1 through 3-N. Each base unit comprises FDM (frequency division multiplex) channel units 5-1 through 5-K each being capable of establishing a two-way control channel or a two-way speech channel. For a typical system, speech channels are provided as channels #1 through #49 and a control channel as channel #50. The extension lines from the local switching system 1 are terminated respectively to these channel units. Cordless units 6 are located in each service zone 3. During an idle state, each cordless unit is constantly monitoring the control channel, ready to receive control signals from any of the channel units of the zone in which it is located, to tune to one of the speech channels with frequency division multiplex with other channel units when a call is originated or received. The number of channel units provided for each service zone is dependent on the amount of traffic of the respective zone.

Speech channels #1 through #49 are organized into several groups so that no intermodulation products occur between the speech channels of the same group as well as between any of the speech channels and the control channel. According to the present invention, the channel groups are given priority values which are dynamically altered in a manner to be described, and each service zone is assigned a channel group whose priority value is higher than a previous one.

Figure 2:
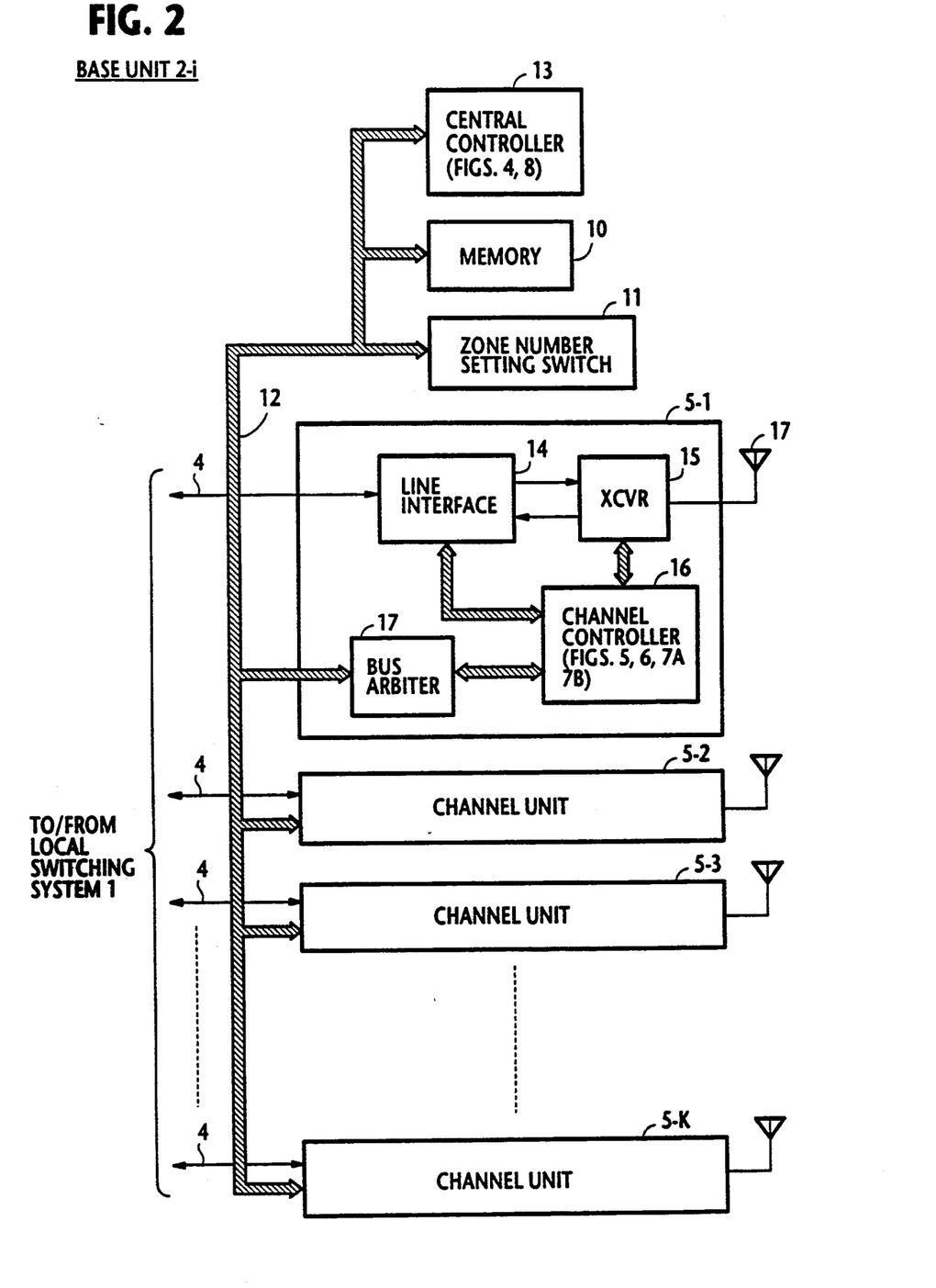
FIG. 2 is a block diagram of a base unit of FIG. 1.

As shown in FIG. 2, each base unit 2-i comprises a memory 10 and a zone number setting switch 11 which are coupled by way of a common bus 12 to channel units 5-1 through 5-K. The zone number setting switch 11 of each service zone has a dial which is a manually set to indicate a channel group number initially assigned to the service zone. A central controller 13 provides initialization procedure to be described. Each channel unit 5 includes a line interface 14 coupled through the associated extension line 4 to the local switching system 1. A radio-frequency transceiver 15 is coupled to the line interface 13 and to a channel controller 16 and is normally tuned to the common control channel to receive call processing signals through interface 13 or from cordless units 6 through antenna 18 for setting up a two-way speech channel under control of the channel controller. Channel controller 16 cooperates with memory 10 and zone number setting switch 11 by way of a bus arbiter 17 to dynamically assign a speech channel in a manner as will be described. Bus arbiter 17 provides arbitration among channel units 5 when more than one channel unit attempts to obtain the fight to use the common channel 13.

Figure 3:
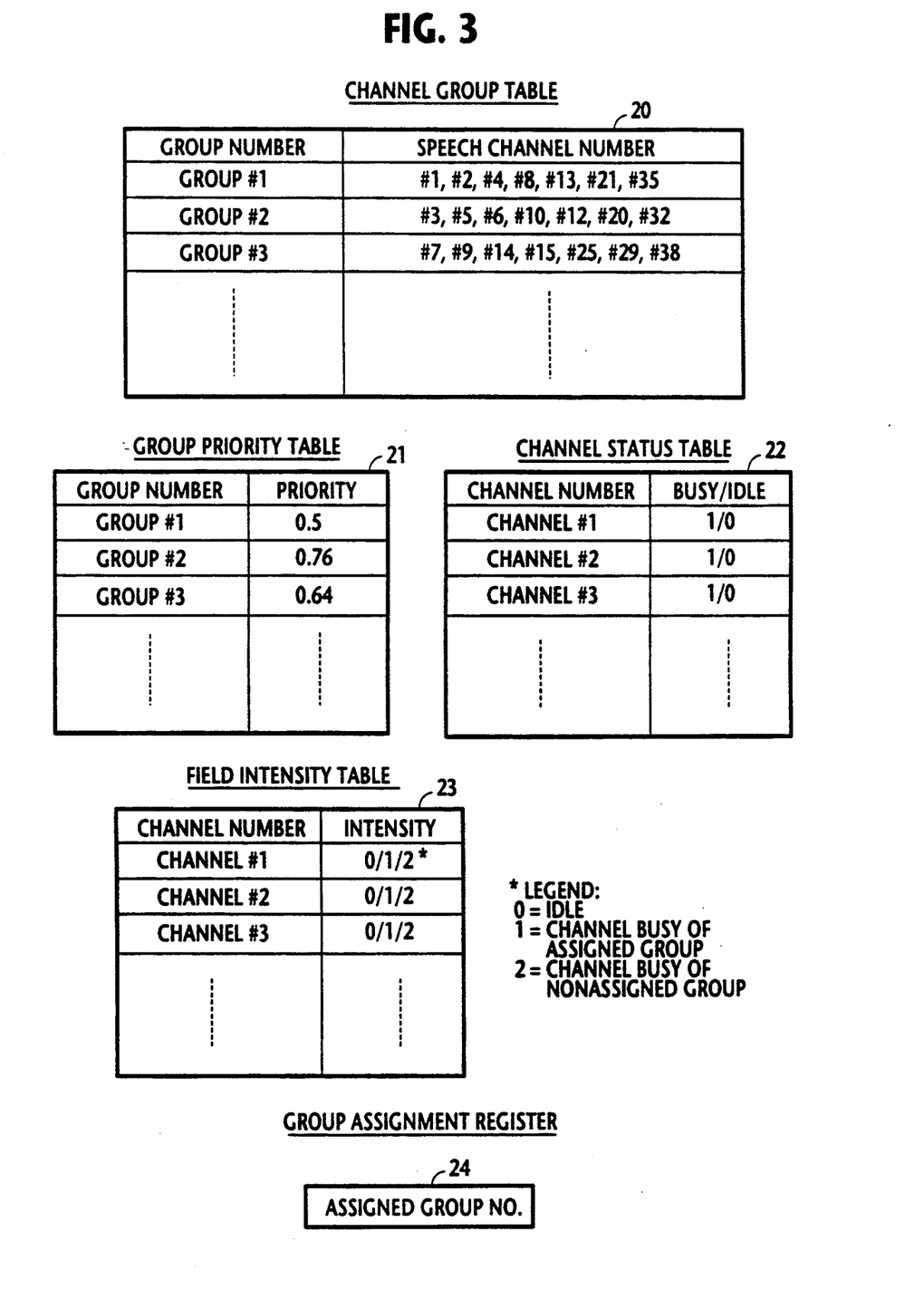
FIG. 3 shows details of the common memory of FIG. 2.

As shown in FIG. 3, memory 10 is partitioned into several areas for defining a channel group table 20, a priority group table 21, a channel status table 22, a field intensity table 23 and a group assignment register 24. Channel group table 20 defines a map establishing relationships between channel group identifiers and speech channel numbers. For example, channels #1, #2, #4, #8, #13, #21 and #35 are organized into group #1 and among which no intermodulation occurs. Priority group table 21 defines relationships between channel groups and priority values. As will be described, each group is initially given a priority value of 0.5, which is updated dynamically depending on the usage of all channels of the system. Channel status table 22 establishes relationships between channels of the system and their busy/idle status, and field intensity table 23 defines relationships between all channels of the system and their field intensity levels represented by one of codes "0", "1" and "2". As will be described in detail later, field intensity table 23 is updated by first checking each channel entry of channel status table 22 to see if it is busy or idle. If it is busy, code "1" is stored into the field intensity column of the corresponding channel entry of field intensity table 23 without performing a field intensity test. If channel status table 22 shows that a channel is idle, the field intensity of this channel is checked to see if it is higher or lower than a prescribed level. If it is higher than the prescribed level, the channel under test is recognized as a channel of other group and is currently in a busy state. In such instances, code "2" is stored into the field intensity table 23. Otherwise, a code "0" is stored into field intensity table 23. Group assignment register 24 is used to store an assigned channel group number. When a call request is originated from a cordless unit or an incoming call is received, control channel unit 5 accesses this assignment table to identify which group is assigned to which zone.

Figure 4:
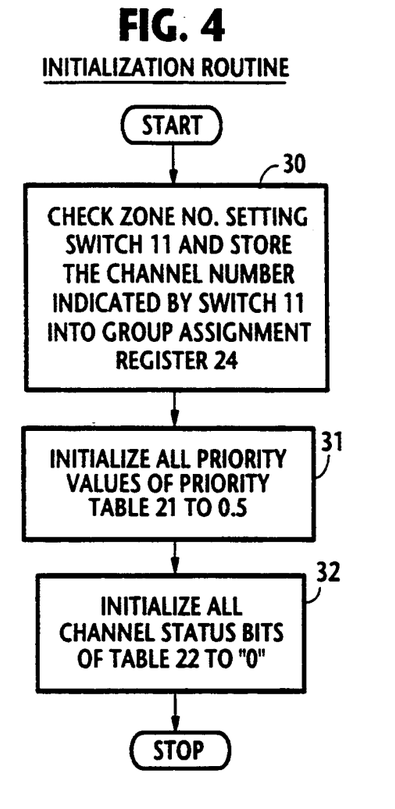
FIG. 4 is a flowchart showing steps of initialization routine performed by the central controller of a base unit.

Central controller 13 is programmed to perform an initialization routine as illustrated in FIG. 4.

During an initial system startup, the initialization routine begins with step 30 which checks the zone number setting switch 11 to look up the zone number initially assigned to the own service zone and stores it into the group assignment register 24 as an initial channel-group assignment procedure. Control goes to step 31 to set all priority values of channel priority table 21 to an initial value of, say, 0.5. Exit then is to step 32 to initialize channel status table 22 by setting all of its status bits to "0" (i.e., idle state).

Figure 5:
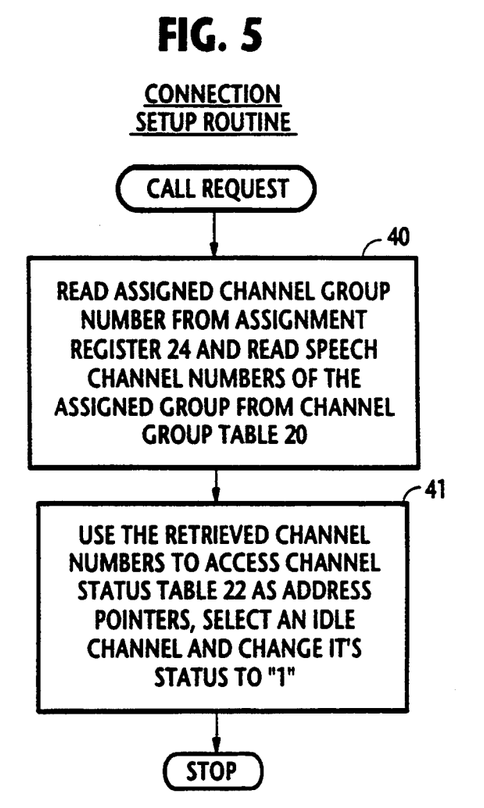
FIGS. 5 and 6 are flowcharts respectively showing steps of connection setup and clearing routines performed by the controller of a channel unit.
Figure 6:
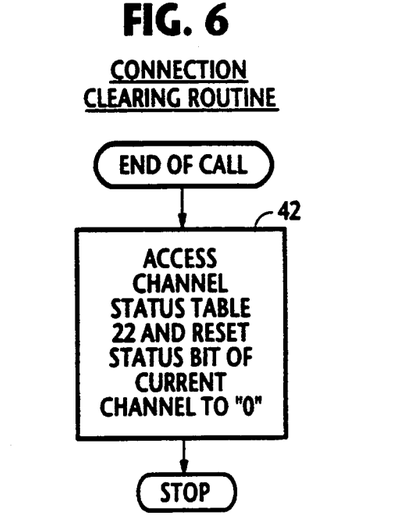

The channel controller 16 of each channel unit is programmed to process call processing signals over the control channel as well as to perform channel assignment procedures. With the system initialization procedure being complete, the channel controller 16 of one of the channel units may respond to a call request from a cordless unit and invokes a channel status update routine (FIG. 5). This routine starts with step 40 to access the group assignment register 24 to read out each of the initially assigned channel groups and then the channel group table 20 is accessed to read all the channel numbers of the initially assigned group. Control proceeds to step 41 to use the retrieved channel numbers to access the channel status table 22 as address pointers. An idle channel is selected from the assigned group and the status bit of the selected channel is changed to "1". In a manner well known in the art, controller 16 causes transceiver 15 to be tuned to the selected speech channel to allow the calling cordless unit to enter a talking mode. The controller 16 of the talking channel eventually responds to an end-of-call signal from the cordless unit by executing step 42 (FIG. 6) in which it accesses channel status table 22 to reset the status of the speech channel to "0".

Figure 7A:
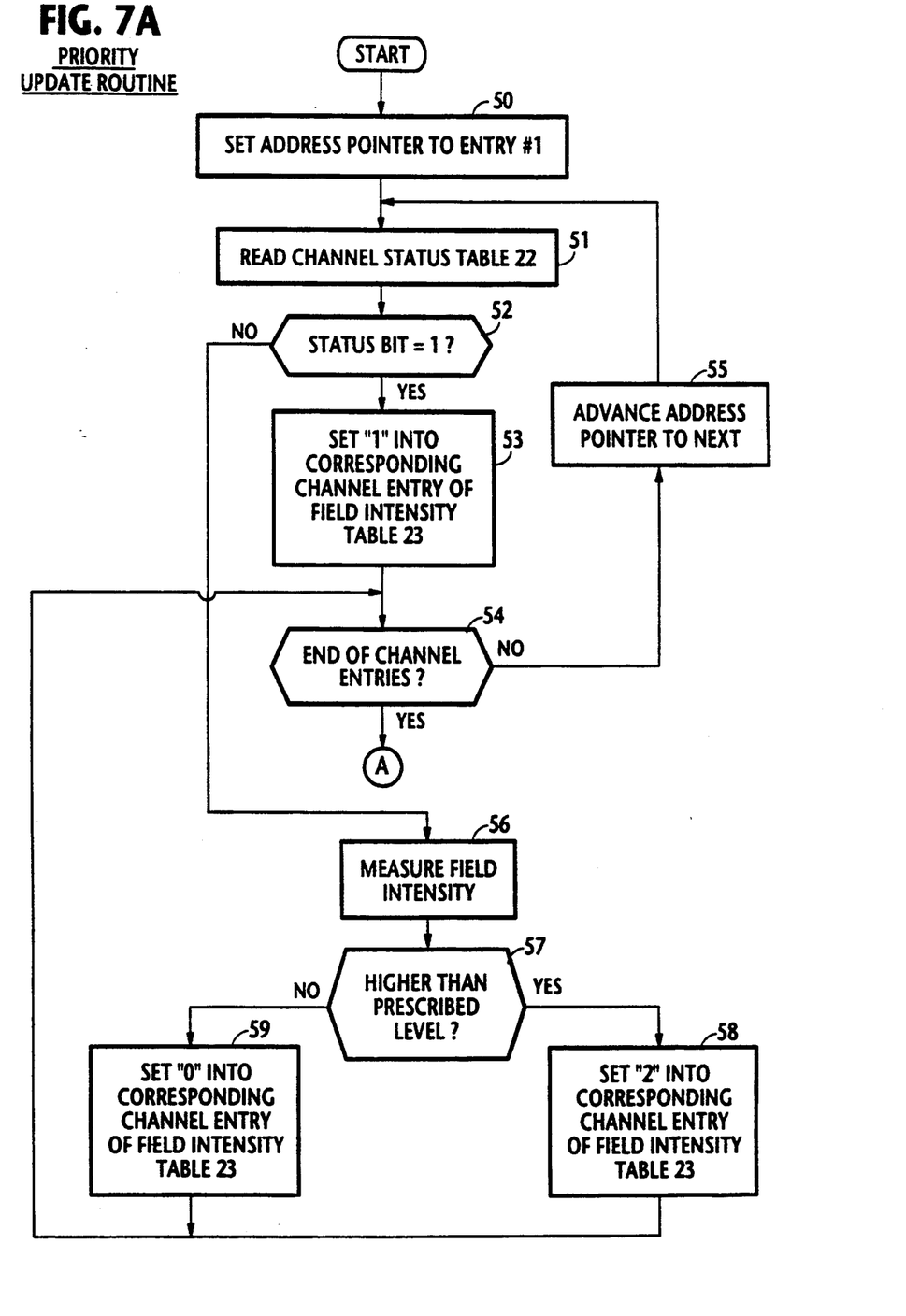
FIGS. 7A and 7B are flowcharts showing steps of a priority update routine performed by the controller of a channel unit.
Figure 7B:
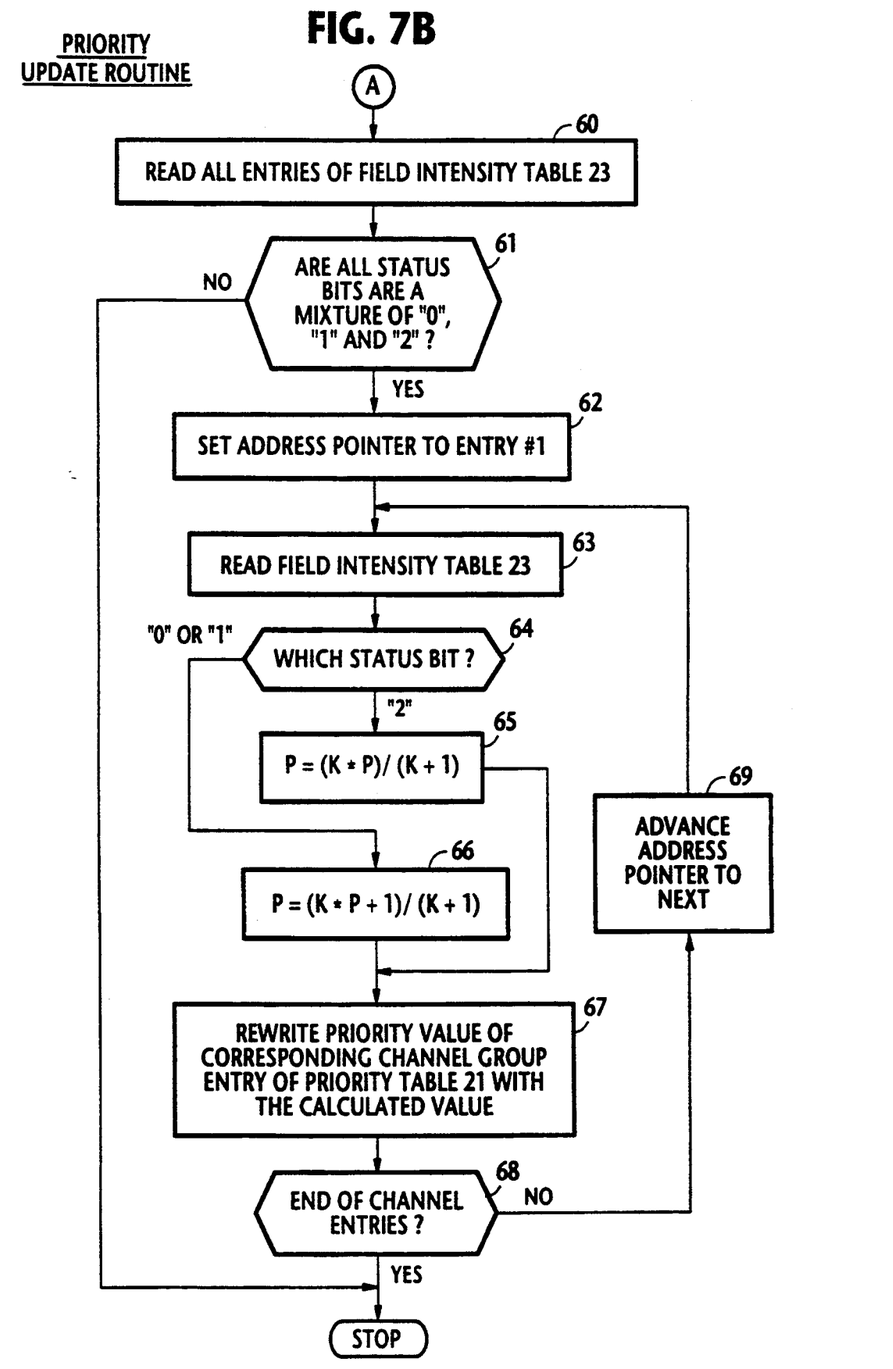

FIGS. 7A and 7B are flowcharts illustrating a priority update routine. This update routine is invoked at periodic intervals and begins with step 50 which directs the setting of the address pointer of channel status table 22 to channel entry #1. Exit then is to step 51 to read the channel status table 22. Control proceeds to decision step 52 to check to see if the status bit of the accessed entry of table 22 is "1". If this is the case, control branches at step 52 to step 53 to set a code "1" into the corresponding channel entry of the field intensity table 23 as an indication that the channel being examined is one that belongs to the same group and is currently in a busy state. Control exits to step 54 to check to see if the end of channel entries is reached in channel status table 22. If the answer is negative, control branches to step 55 to advance the address pointer to the next and returns to step 51 to repeat the process. In this way, the busy states of the channel status table 22 are transferred to corresponding channel entries of the field intensity table 23.

If the status bit of the examined channel entry of status table 22 is "0", (i,e., idle state), control branches at step 52 to step 56 to measure the field intensity of the speech channel of the entry being examined. Control advances to step 57 to determine if the measured field intensity is higher than a prescribed level. If the answer is affirmative, control branches to step 58 to set a code "2" into the corresponding channel entry of the field intensity table 23 as an indication that the channel being examined is one that belongs to the group assigned to another base unit. Otherwise, control branches to step 59 to set a code "0", into the corresponding channel entry of field intensity table 23 as an indication that the channel being examined is one that belongs to the same group and is currently in an idle state. Following the execution of either step 58 or 59, control returns to step 54. In this way, all channel entries of channel status table 22 are eventually set either to "0", "1" or "2", and control branches at step 54 to step 60 (FIG. 7B).

At step 60 all entries of the field intensity table 23 are sequentially retrieved for checking to see if they comprise a mixture of codes "0", "1" and "2". If the answer is negative, control branches at step 61 to the end of this routine, and if it is affirmative, control branches at step 61 to step 62 to set the address pointer of the field intensity table 23 to entry #1 to start reading field intensity data (step 63) from the starting location. Exit then is to decision step 64 to check to see if the status bit of the addressed channel is code "2" or otherwise. If a code "2" is detected, control branches at step 64 to step 65 to calculate the following formula, $$P = (K \times P)/(K+1) \quad (1)$$

where, P is a priority value and K a constant which determines an incremental/decremental value of the priority value with respect to the previous value, and is typically a K-value of 128 is adopted. Control proceeds to step 67 to set the calculated priority value into the corresponding channel-group entry of the priority table 21 rewriting a previous priority value.

If the status bit read out of table 23 is code "0", or "1", control branches at step 64 to step 66 to calculate the following formula, $$P = (K \times P + 1)/(K+1) \quad (2)$$

and proceeds to step 67 to set the calculated priority value into the corresponding channel-group entry of the priority table 21. The priority value P obtained by Equations (1) and (2) varies in the range between 0 and 1. Note that each result of Equation (1) is greater than the previous value and the incremental value of the result becomes smaller as the priority value P approaches unity and becomes greater as it approaches zero, while each result of Equation (2) is smaller than the previous and the decremental value of the result becomes greater as the priority value P approaches unity and becomes smaller as it approaches zero.

After executing an end-of-entries checking step in decision block 68 following block 67, the address pointer is advanced to the next (step 69) if all entries have not yet been checked, and control returns to step 63 to read the next channel entry of the field intensity table 23, in this way, the previous priority value of each channel group is rewritten with a calculated value subsequently derived from the next channel entry of the channel group, and each entry of the priority table 21 is filled with a value obtained from the last calculation. If the decision in step 68 becomes affirmative, control terminates the priority update routine.

Since the calculated priority value reflects the previous priority value of the same channel group and the calculation is repeated on all channels of the same group to rewrite the previous value, the final priority value is a result of a statistical process. Further, the priority value is varied depending on whether the field intensity level of idle channels is higher or lower than a specified value, the priority of each channel group represents a statistical result of the usage of the channels of the group over an extended period of time. Therefore, channel assignment is dynamically performed without causing interference between adjacent service zones and without being adversely affected by a time-varying traffic load.

In addition, since the priority updating steps 62 through 68 are skipped when all status bits of the field intensity table 23 are other than a mixture of codes "0", "1" and "2", the priority values of all channel groups tend to converge to a certain value during a light traffic period, effectively reducing the range of priority values which are derived during a heavy traffic period. This feature produces a further stabilizing effect on the dynamic channel assignment scheme.

Figure 8:
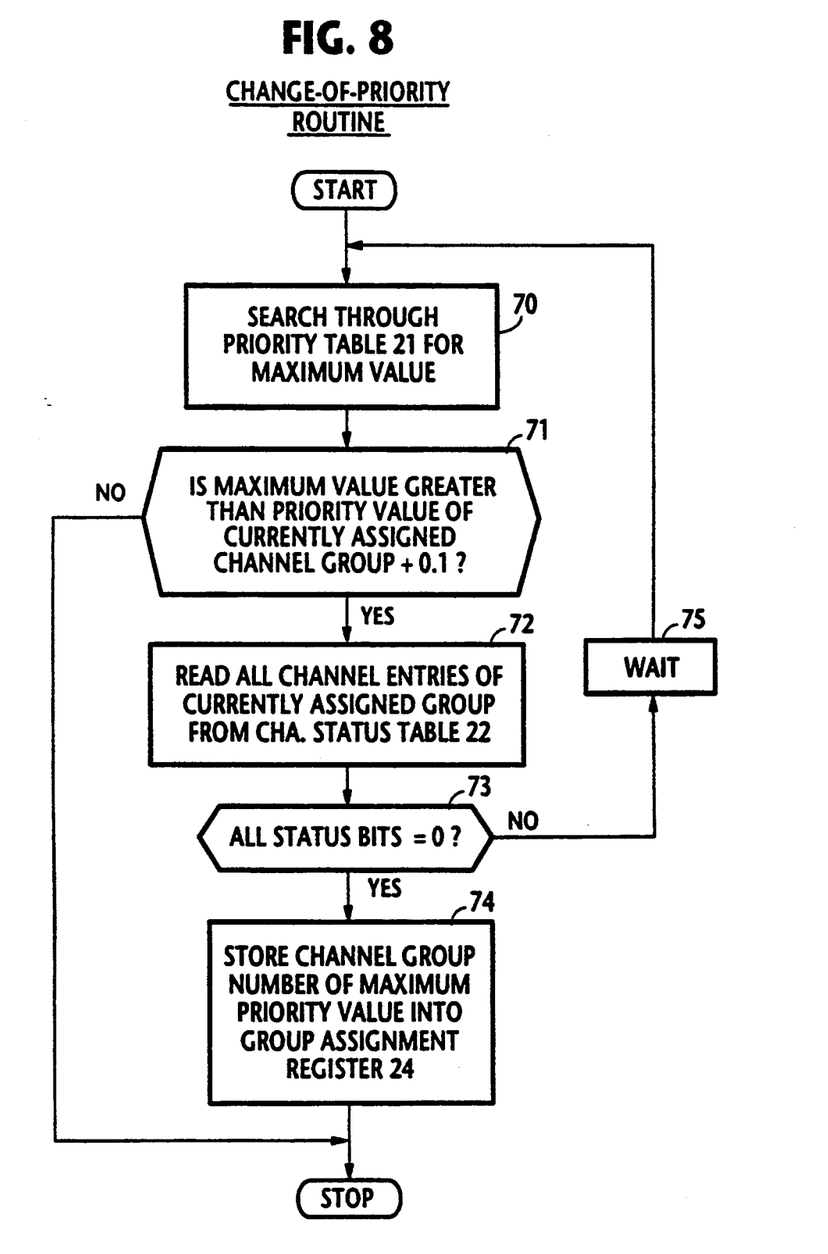
FIG. 8 is a flowchart showing steps of a change-of-priority routine performed by the central controller.

The central controller 13 of each base unit is further programmed to execute a change-of-priority routine shown in FIG. 8 at periodic intervals. This routine begins with step 70 to make a search through all entries of priority table 21 for a maximum value. Exit then is to decision step 71 to compare the maximum priority value with the current priority value of a channel group which is assigned to the base unit. If the maximum value is greater than the current value by more than a predetermined value, typically 0.1, control branches at step 71 to step 72 to read all channel status bits of the currently assigned channel group from the channel status table 22 and goes to decision step 73 to determine if all status bits are zero (i.e., all channels of the currently assigned group are idle). If the answer is affirmative, controller 16 of each service zone 3-i branches at step 73 to step 74 to store the channel group number of the maximum priority value into the corresponding zone entry of the group assignment register 24, thus rewriting a previously stored channel group number. If all speech channels of the currently assigned group are busy, the decision is negative in step 73 and control branches to step 75 to wait a certain period of time and returns to step 70 to repeat the process until all status bits of table 22 becomes zero. If step 71 makes a negative decision, control branches to the end of the routine, leaving the current channel group number in the group assignment register 24 unchanged.

Since the channel group register 24 is updated only when the maximum priority value is greater than the current value of a base unit by more than a specified amount, it is possible for the base unit to avoid changing channel groups when the channels of the current group are temporarily rendered all busy. This feature ensures channel assignment stability even when two or more channel groups have slightly differing priority values.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A telecommunication network for serving cordless units located in a plurality of service zones, said network having radio speech channels which are organized into a plurality of channel groups such that no intermodulation products occur among the channels of each group, said network comprising a plurality of base units located respectively in said service zones, each of said base units comprising:

means for establishing two-way speech channels with those of the cordless units which are located in the same zone as the base unit;

a priority table for storing priority values of said channel groups;

means for detecting a maximum priority value from said priority table at periodic intervals and assigning one of said channel groups having the detected priority value to the base unit; and means for (a) measuring field intensity of each of said radio channels, classifying the measured field intensity of each channel as representing first, second or third possible states, (b) determining whether all the measured field intensities simultaneously represent a mixture of said first, second and third possible states, (c) increasing the priority value of the assigned channel group if the measured field intensity of each channel is classified as representing the third possible state and all the measured field intensities are determined as representing said mixture of possible states, and (d) decreasing the priority value of the assigned channel group if the measured field intensity of each channel is classified as representing the first or second possible state and all the measured field intensities are determined as representing said mixture of possible states, said first, second and third possible states representing respectively an idle state of a channel, a busy state of a channel of the assigned channel group, and a busy state of a channel of a channel group other than the assigned channel group.

2. A telecommunication network for serving cordless units located in a plurality of service zones, said network having radio speech channels which are organized into a plurality of channel groups such that no intermodulation products occur among the channels of each group, said network comprising a plurality of base units located respectively in said service zones, each of said base units comprising:

means for establishing two-way speech channels with those of the cordless units which are located in the same zone as the base unit;

a priority table for storing priority values of said channel groups;

means for detecting a maximum priority value from said priority table and assigning one of the channel groups having the detected priority value to the base unit;

means for (a) measuring field intensity of each of said radio speech channels, classifying the measured field intensity of each channel as representing first, second or third possible states of the channel, (b) determining whether all the measured field intensities simultaneously represent a mixture of said first, second and third possible states of said channels, (c) increasing the stored priority value of the assigned channel group if the measured field intensity of each channel is classified as representing the third possible state and all the measured field intensities are determined as representing said mixture of possible states, and (d) decreasing said stored priority value of the assigned channel group if the measured field intensity of each channel is classified as representing the first or second possible state and all the measured field intensities are determined as representing said mixture of possible states, said first, second and third possible states representing respectively an idle state of each channel, a busy state of each channel of the channel group currently assigned to the base unit, and a busy state of a channel of a channel group other than the assigned channel group;

means for detecting a maximum priority value from said priority table; and means for comparing the detected maximum priority value with the priority value of the assigned channel group and reassigning one of said channel groups having said maximum priority value instead of the current channel group if the maximum priority value is greater than the priority value of the current channel group by more than a predetermined amount.

3. A telecommunication network for serving cordless units located in a plurality of service zones, said network having radio speech channels which are organized into a plurality of channel group such that no intermodulation products occur among the channels of each group, said network comprising a plurality of base units located respectively in said service zones, each of said base units comprising:

means for establishing two-way speech channels with those of the cordless units which are located in the same zone as the base unit;

priority table for storing priority values of said channel groups;

means for detecting a maximum priority value from said priority table and assigning one of said channel groups having the detected priority value to the base unit;

a channel status table for storing busy/idle status bits indicating the busy/idle states of said channels;

means for receiving a call request to or from said cordless units located in the same zone as the base unit, and updating the busy/idle status bits of the channels of the assigned channel group; and means for (a) sequentially retrieving all the busy/idle status bits from said channel status table, (b) classifying each channel of all said groups as representing a first possible state of the channel if the retrieved status bit indicates a busy state of the channel, (c) measuring field intensity of each channel of all said groups if the retrieved status bit indicates an idle or busy state of the channel and classifying the channel as representing a second possible state if the measured field intensity of the channel is lower than a specified value or a third possible state of the channel if the measured field intensity is higher than the specified value, (d) determining whether all the channels are classified as simultaneously representing a mixture of said first, second and third possible states, (e) increasing the stored priority value of the assigned channel group if each channel of all said groups is classified as representing the third possible state and all channels of said groups are determined as representing said mixture of said possible states and (f) decreasing said stored priority value of the assigned channel group if each channel of all said groups is classified as representing the first or second possible state and all channels of said groups are determined as representing said mixture of said possible states, said third possible state representing a busy state of each channel of a channel group other than said assigned channel group.

4. A telecommunication network as claimed in claim 3, wherein said maximum value detecting and assigning means comprises means for retrieving the busy/idle status bits of the channels of the assigned group, detecting a maximum priority value subsequently from the priority table, and reassigning the channel group having the subsequently detected maximum priority value to the base unit if the retrieved status bits indicate all idle states.

5. A telecommunication network for serving cordless units located in a plurality of service zones, said network having radio speech channels which are organized into a plurality of channel groups such that no intermodulation products occur among the channels of each group, said network comprising a plurality of base units located respectively in said service zones, each of said base units comprising:
  means for establishing two-way speech channels with those of the cordless units which are located in the same zone as the base unit;
  priority table for storing priority values of said channel groups;
  means for detecting a maximum priority value from said priority table and assigning one of channel groups having the detected priority value to the base unit;
  a channel status table for storing busy/idle status bits indicating the busy/idle states of said channels;
  means for receiving a call request to or from said cordless units located in the same zone as the base unit, and updating the busy/idle status bits of the channels of the assigned channel group;
  means for (a) sequentially retrieving all the busy/idle status bits from said channel status table, (b) classifying each channel of all said groups as representing a first possible state of the channel if the retrieved status bit indicates a busy state of the channel, (c) measuring field intensity of each channel of all said groups if the retrieved status bit indicates an idle or busy state of the channel and classifying the channel as representing a second possible state of the channel if the measured field intensity of the channel is lower than a specified value or a third possible state of the channel if the measured field intensity is higher than the specified value, (d) determining whether all the channels are classified as simultaneously representing a mixture of said first, second and third possible states, (e) increasing the priority value of the assigned channel group if each channel of all said groups is classified as representing the third possible state and if all channels of said groups are determined as representing said mixture of said possible states, and (f) decreasing said stored priority value of the currently assigned channel group if each channel of all said groups is classified as representing the first or second possible state and if all channels of said groups are determined as representing said mixture of said possible states, said third possible state representing a busy state of each channel of a channel group which is not currently assigned to the base unit;
  means for comparing the increased priority value with the priority value of the assigned channel group and reassigning one of said channel groups having said increased priority value instead of the current channel group if the increased priority value is greater than the priority value of the current channel group by more than a predetermined amount.

6. A telecommunication network as claimed in claim 1, further comprising a local switching system connected to a public switched telecommunication network, wherein said base units are connected to said local switching system.

7. In a telecommunication network for serving cordless units located in a plurality of service zones, said network having radio speech channels which are organized into a plurality of channel groups such that no intermodulation products occur among the channels of each group, said network comprising a plurality of base units located respectively in said service zones, each of said base units comprising means for establishing two-way speech channels with those of the cordless units which are located in the same zone as the base unit, and a priority table for storing priority values of said channel groups, a method for assigning one of said channel groups to each one of said base units comprising the steps of:
  a) detecting a maximum priority value from the priority table and assigning one of said channel groups having the detected maximum priority value to the base unit;
  b) measuring field intensity of each of said radio channels;
  c) classifying the measured field intensity of each channel as representing first, second or third possible states of the channel;
  d) determining whether all the measured field intensities simultaneously represent a mixture of said first, second and third possible states, said first, second and third possible states representing respectively an idle state of each channel, a busy state of each channel of the assigned channel group, and a busy state of each channel of a channel group other than the assigned channel group; and
  e) if all measured field intensities are determined by the step (d) as representing said mixture of said possible sates, increasing the priority value of the assigned channel group if the measured field intensity of each channel is classified by the step (c) as representing the third possible state and decreasing the priority value of the assigned channel group if the measured field intensity of each channel is classified by the step (c) as representing the first or second possible state.

8. In a telecommunication network for serving cordless units located in a plurality of service zones, said network having radio speech channels which are organized into a plurality of channel groups such that no intermodulation products occur among the channels of each group, said network comprising a plurality of base units located respectively in said service zones, each of said base units comprising means for establishing two-way speech channels with those of the cordless units which are located in the same zone as the base unit, a priority table for storing priority values of said channel groups, and a channel status table for storing busy/idle status bits indicating the busy/idle states of said channels, a method for assigning one of said channel groups to each one of said base units comprising the steps of:

a) detecting a maximum priority value from the priority table and assigning one of said channel groups having the detected maximum priority value to the base unit;

b) receiving a call request to or from said cordless units located in the same zone as the base unit, and updating the busy/idle status bits of the channels of the assigned channel group;

c) sequentially retrieving all the busy/idle status bits from said channel status table;

d) classifying each channel of all said groups as representing a first possible state of the channel if the retrieved status bit indicates a busy state of the channel;

e) measuring field intensity of each channel of all said groups if the retrieved status bit indicates an idle busy state of the channel and classifying the channel as representing a second possible state of the channel if the measured field intensity of the channel is lower than a specified value or a third possible state of the channel if the measured field intensity is higher than the specified value, said third possible state representing a busy state of each channel of a channel group other than the assigned channel group;

f) determining whether all the channels of said groups are classified sa simultaneously representing a mixture of said first, second and third possible states; and g) if all channels of said groups are determined by the step (f) as representing said mixture of said possible states, increasing the priority value of the assigned channel group if each channel of all said groups is classified by the step (d) as representing the third possible state, and decreasing the priority value of the assigned channel group if each channel of all said groups is classified by the step (d) as representing the first or second possible state.

9. A method as claimed in claim 7, further comprising the steps of:

1) detecting a maximum priority value from said priority table;

2) comparing the maximum priority value detected by the step (1) with the priority value of a channel group currently assigned to the base unit; and 3) reassigning one of the channel groups having the maximum priority value detected by the step (1) to the base unit if the priority value detected by the step (1) is greater than the priority value of the currently assigned channel group.

10. A method as claimed in claim 8, further comprising the steps of:

1) detecting a maximum priority value from said priority table;

2) comparing the maximum priority value detected by the step (1) with the priority value of a channel groups currently assigned to the base unit; and 3) reassigning one of the channel groups having the maximum priority value detected by the step (1) to the base unit if the priority value detected by the step (1) is greater than the priority value of the currently assigned channel group.

* * * * *